H. HUEBER.
AUTOMATIC OIL FEEDER.
APPLICATION FILED APR. 5, 1915.
1,175,869.
Patented Mar. 14, 1916.
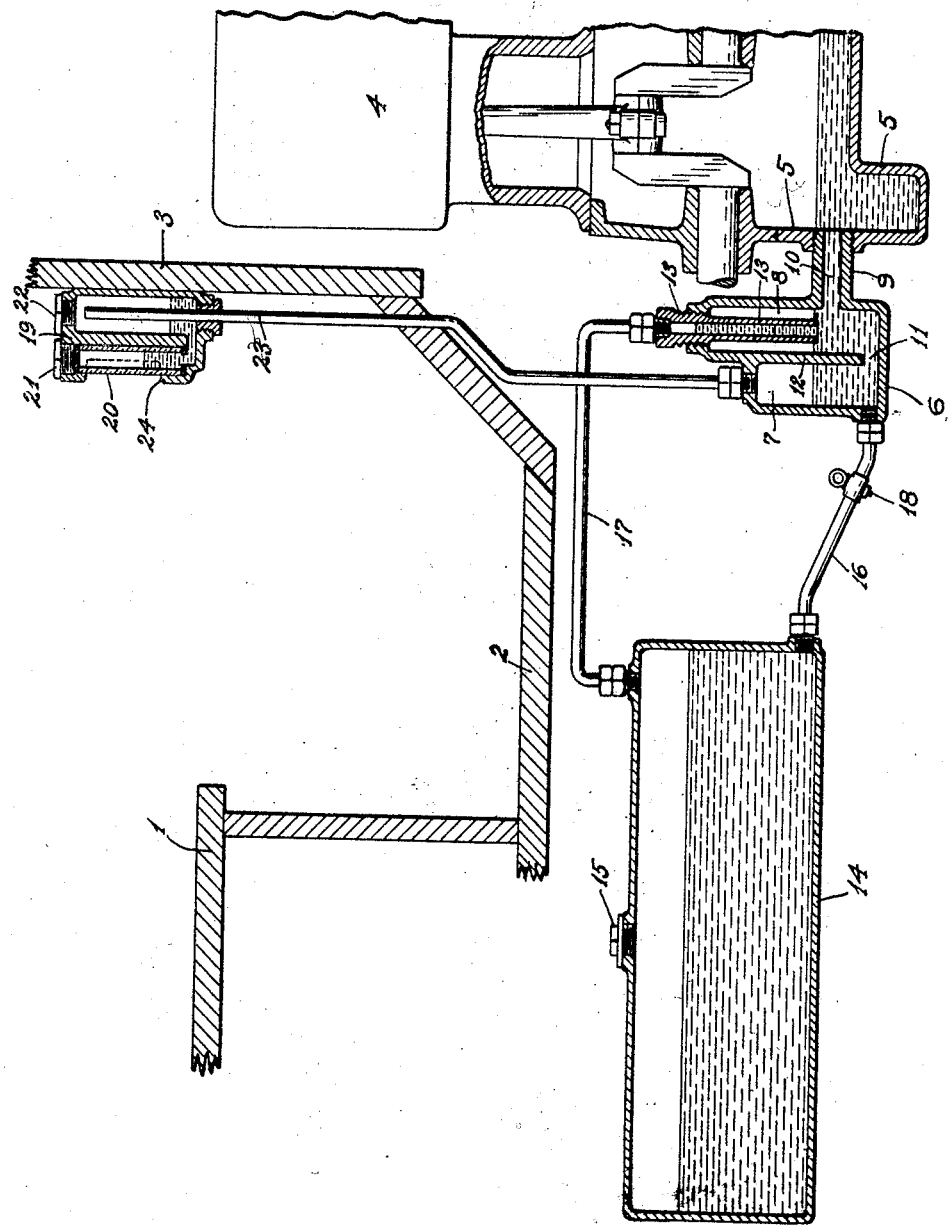
WITNESSES:
O. Johnson
A. Haskins
INVENTOR
Henry Hueber
BY
C. D. Haskins
ATTORNEY

UNITED STATES PATENT OFFICE.

HENRY HUEBER, OF SEATTLE, WASHINGTON, ASSIGNOR TO HANNA VELINE, OF SEATTLE, WASHINGTON.

AUTOMATIC OIL-FEEDER.

1,175,869.

Specification of Letters Patent.

Patented Mar. 14, 1916.

Application filed April 5, 1915. Serial No. 19,371.

*To all whom it may concern:*

Be it known that I, HENRY HUEBER, citizen of the United States, residing at Seattle, in the county of King and State of Washington, have invented a certain new and useful Improvement in Automatic Oil-Feeders, of which the following is a specification.

My invention relates to improvements in automatic oil feeders which are adapted automatically to control the flow of oil from an oil receptacle to a desired point of distribution and more particularly it relates to apparatus which is adapted to be embodied in a motor vehicle, as an automobile, where it may operate to control automatically the flow of lubricating oil from a tank to the crank case of the engine of such automobile, and the object of my invention is to provide an automatic oil feeder which shall be simple in its plan of construction and reliable in its operation, and which can be readily applied to existing motive vehicles.

A further object of my invention is to provide such an automatic oil feeder for automobiles that shall embody means for indicating a decrease in the desired normal depth of the lubricating oil within the crank case of the engine of an automobile due to cessation of flow of such oil thereinto, by reason of the oil in the oil tank of an automobile being wholly consumed or by any other reason.

I accomplish these objects by devices illustrated in the accompanying drawing by a view in vertical mid-section wherein is indicated parts of an automobile with which is associated an oil feeder embodying my invention.

Referring to the drawing, 1 indicates the driver's seat and 2 the floor of an automobile, while 3 indicates the dashboard thereof, which automobile is provided with a gasolene engine with its crank case 5.

An airtight receptacle 6 is provided with two chambers 7 and 8 and with a nipple 9, which nipple 9 projects from one side of the walls of the chamber 8 to screw into a screw-threaded hole in the side wall of the crank case 5 and extending through said nipple 9 is a passageway 10 through which oil may flow from the chamber 8 into the interior of the crank case 5 at a point adjacent to the plane of the surface of the desired normal quantity of oil which is required to be maintained therein.

Between the chambers 7 and 8 is a passageway 11 extending through the lower portion of a partition 12 which serves as a wall between the chambers 7 and 8, and through said passageway 11 oil may flow from the chamber 7 into the chamber 8.

Through the top wall of the chamber 8 is a screw-threaded hole, as shown, within which is disposed a screw-threaded tube 13 that projects downwardly into the chamber 8 and which is adapted to be adjustable with respect to its vertical position so that it may be turned to raise it or lower it to a desired position with respect to the surface of any oil that may be contained within said chamber 8.

Associated with the automobile at some convenient point is an airtight oil tank 14 which may contain a supply of lubricating oil and which is provided with a screw-threaded hole through its top wall within which hole is removably disposed a screw-threaded plug 15, through which hole oil may flow in the operation of filling said tank 14 with oil.

A conducting pipe 16 is connected between the lower portion of the tank 14 and the lower portion of the chamber 7 through which oil may flow from said tank 14 to said chamber 7, and a flexible conducting pipe 17 is disposed to connect the upper portion of the tank 14 with the top end of the tube 13 to form a passageway therebetween. The conducting pipe 16 is provided with a shut-off valve 18 which may be closed during the operation of filling the supply tank 14 with oil.

Thus, as connected, with the shut-off valve 18 open, all the spaces within the tank 14, the pipes 16, the pipe 17, the tube 13, the chamber 7 and the chamber 8, are in connection each with the others, and hence, if the ank 14 contains oil, and the crank case 5 be empty then such oil will flow from the tank 14 through the pipe 16 into the chamber 7, thence into the chamber 8, through the passageway 10 into the crank case 5 until the surface of the oil in the crank case 5 rises to a plane that is level with the face of the bottom end of the tube 13 to cause the surface of the oil in the chamber 8 to engage with and cover such bottom end of said tube 13, thus to prevent air from passing upwardly through said tube 13, thence through pipe 17 into the space above the surface of the oil in the tank 14, whereupon oil will ascend the tube 13 until its surface reaches the plane of the surface of the oil in the tank 14 and under these conditions oil will cease flowing from the tank 14 into the crank case 5, since the plug 15 prevents any air from entering the tank 14 and since no air can enter such tank 14 through the pipe 17, and further flow of oil from the tank 14 would tend to cause a vacuum in the space above the surface of the oil in said tank 14; thus, the surface of the oil in the crank case 5, due to atmospheric pressure thereon, cannot rise above the plane that registers with the bottom end of the tube 13; but when, by the operation of the engine, the oil in the crank case 5 is decreased in depth to cause its surface to fall lower than the plan of the bottom of the tube 13, then air will find its way through the passageway 10 into the tube 13, thence through the pipe 17 into the space above the oil in the tank 14 to interrupt the tendency to form a vacuum therein and thereupon oil will again flow from said tank 14 into the crank case 5, again to raise the surface of the oil in the chamber 8 sufficiently high again to cover the bottom of the tube 13, again to interrupt the flow of oil from the tank 14 into the crank case 5, whereby the quantity of oil in the crank case 5 will be maintained automatically at substantially a constant depth in an obvious manner.

In order to indicate to the driver of the automobile the cessation of flow of oil through the pipe 16, by reason of the tank 14 becoming empty, or by reason of obstruction in the pipe 16, whereby the oil in the crank case 5 and in the chambers 7 and 8 will decrease to less than the desired normal depth, I have provided an indicator against the side of the dashboard 3 facing the driver's seat, which indicator comprises a receptacle formed of a closed metal tube 19 and a smaller glass tube 20 disposed vertically adjacent to and parallel to each other and provided with a passageway through which fluid may flow between the bottom of the space within the metal tube 19 and the bottom of the space within the glass tube 20.

The tops of the glass tube 20 and the metal tube 19 are closed by screw-threaded plugs 21 and 22, respectively, and extending upwardly through the bottom of the metal tube 19 is a pipe 23 which terminates at a point near the top of the interior space within said metal tube 19, and such pipe 23 being disposed to extend downwardly from the indicator to connect with the chamber 7, whereby air from the upper portion of said chamber 7 will tend to flow up and down within said tube 23 in response to changes in the depth of oil in the lower portion of said chamber 7.

The operation of the indicator thus constructed is as follows: When the crank case 5 is empty one of the plugs 21 or 22 is removed and a suitable fluid, as oil or glycerin (which may be colored to a desired shade) is poured in until its surface in the glass tube 21 rises to a point corresponding to the point 24 in the drawing where it will be hardly visible and thereupon said plug may be replaced to close tightly the receptacle; then the valve 18 is opened to permit oil to flow from the tank 14 into the crank case 5 and as the oil in said crank case 5 rises to its required normal level the oil in the chamber 7 will rise correspondingly, thus forcing the air in the upper part of said chamber 7 into and through the tube 23 and into the space above the indicating fluid in the metal tube 19 with the result that such indicating fluid will be forced from said metal tube 19 into the glass tube 20 causing such fluid to rise perceptibly above the point corresponding to the point 24 where it can be readily seen by the driver, thus indicating to him that there is a proper amount of oil in the crank case 5. If, however, the tank 14 becomes empty and the oil in the crank case 5 decreases in depth then the falling of the oil in the chamber 7 will withdraw air from the space above the fluid in the tube 19 to cause such fluid to be on the same level in both of tubes 19 and 20, thus to make such fluid in the glass tube 20 fall out of sight to indicate that said tank 14 is empty, or to indicate that the oil in the crank case 5 is low by reason of obstruction to a flow of oil through the pipe 16.

Manifestly, an automatic regulation of the flow of oil into the crank case 5 from the tank 14 would be effected if the pipe 23 should be removed and the top wall of the chamber 7 closed, thus dispensing with the use of the indicator, but such indicator is preferably employed and is adapted to operate interdependently and conjointly with the oil feeder.

What I claim is:

1. In a structure of the class described, the combination with a crank case of an engine, of an inclosure, means for providing a passageway for oil between the lower portion of the interior space of said inclosure and the crank case of said engine whereby oil in said crank case and oil in said inclosure may be of a uniform level, a gage embodying a fluid receptacle and a transparent tube connected with the lower portion of the interior space of said fluid receptacle, and an air pipe connecting the upper portion of the interior space of said fluid receptacle with the upper portion of the interior space of said inclosure.

2. In a structure of the class described, the combination with the crank case of an engine, of an airtight receptacle which is provided with two chambers communicating with each other through a passageway in their lower portions; a conduit disposed to connect said receptacle with said crank case so that oil may flow from said receptacle into said crank case; a tube disposed to extend downwardly through the top wall of one of said chambers in said receptacle to a point registering with a desired plane of the surface of the oil within said crank case; an airtight oil tank; a conducting pipe disposed to form a passageway between said tube and the upper portion of the space within said tank; a conducting pipe disposed to form a passageway between the lower portion of the space within said tank and the lower portion of the space within the other of said chambers in said receptacle; a screw-threaded hole disposed to extend through the top wall of the said other one of said chambers; a fluid receptacle embodying a vertically disposed glass tube gage whose upper end is closed and whose lower end is connected with the lower portion of the space within said receptacle; and an air pipe having one of its ends fixed in said screw-threaded hole in said other one of said chambers while its other end portion is disposed to terminate within said airtight receptacle at the upper portion thereof.

In witness whereof, I hereunto subscribe my name this twenty-sixth day of March, A. D. 1915.

HENRY HUEBER.

Witnesses:
O. JOHNSON,
A. HASKINS.